(12) United States Patent
Hama

(10) Patent No.: US 7,379,220 B2
(45) Date of Patent: May 27, 2008

(54) MULTI-BEAM COLOR SCANNING DEVICE

(75) Inventor: Yoshihiro Hama, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 1066 days.

(21) Appl. No.: 10/760,313

(22) Filed: Jan. 21, 2004

(65) Prior Publication Data

US 2004/0184121 A1   Sep. 23, 2004

(30) Foreign Application Priority Data

Jan. 22, 2003  (JP)  ............................. 2003-014020

(51) Int. Cl.
G02B 26/08 (2006.01)
(52) U.S. Cl. ...................................... 359/201; 359/216
(58) Field of Classification Search ................ 359/201, 359/202, 204, 205, 216–218; 347/232, 233
See application file for complete search history.

(56) References Cited

U.S. PATENT DOCUMENTS

| | | | |
|---|---|---|---|
| 5,543,955 A | | 8/1996 | Yamazaki et al. |
| 6,137,461 A | * | 10/2000 | Deter et al. .................. 359/216 |
| 7,095,541 B2 | * | 8/2006 | Liu .............................. 359/216 |
| 2003/0184833 A1 | | 10/2003 | Hama et al. |

FOREIGN PATENT DOCUMENTS

| | | |
|---|---|---|
| JP | 1-105271 | 4/1989 |
| JP | 6-98105 | 4/1994 |
| JP | 7-199097 | 8/1995 |
| JP | 2001-004941 | 1/2001 |
| JP | 2001-194603 | 7/2001 |
| JP | 2001-194605 | 7/2001 |
| JP | 2002-300497 | 10/2002 |
| JP | 2003-295078 | 10/2003 |

* cited by examiner

Primary Examiner—Euncha P Cherry
(74) Attorney, Agent, or Firm—Greenblum & Bernstein, P.L.C.

(57) ABSTRACT

A multi-beam color scanning device is provided with a multi-beam light source unit, a first polygonal mirror that deflects the plurality of light beams emitted by the multi-beam light source unit to scan in a horizontal scanning direction. The scanning beams pass through an fθ optical system and are incident on a second polygonal mirror that deflects the light beams in a vertical scanning direction. The second polygonal mirror deflects the light beams by one line in the horizontal scanning direction at every horizontal scanning thereof. The light beams scan within a predetermined scanning area defined by deflection of the first and second polygonal mirrors. There is provided a light receiving unit that receives the plurality of light beams reflected by an object located within the predetermined scanning area. An operation system obtains a three-dimensional shape and color of the object based on the output of the light receiving unit.

16 Claims, 8 Drawing Sheets

MULTI-BEAM COLOR SCANNING DEVICE

BACKGROUND OF THE INVENTION

The present invention relates to a multi-beam color scanning device which emits a plurality of beams to an object and obtains a three-dimensional color image in accordance with the beams reflected by the object.

Conventionally, the image scanning device as described above has been widely used. Examples of such an image scanning device are disclosed in Japanese Patent Provisional Publications No. HEI 01-105271 and No. HEI 06-98105. The conventional image scanning device of the above-described type typically includes a polygonal mirror for deflecting light beams in a predetermined direction (i.e., a main scanning direction), and at the same time, an object such as an image formed on a sheet is moved in a direction perpendicular to the main scanning direction.

Recently, an image scanning device for scanning a three-dimensional shape of an object has been desired. However, the conventional image scanning device is configured to capture an image formed on a sheet as a two-dimensional image, and an improved scanning device has been desired.

SUMMARY OF THE INVENTION

The present invention is advantageous in that an improved multi-beam scanning device capable of obtaining a three-dimensional color image is provided.

According to an aspect of the invention, there is provided multi-beam color scanning device, which is provided with a multi-beam light source unit that emits a plurality of light beams having different wavelengths, a first polygonal mirror that deflects the plurality of light beams emitted by the multi-beam light source unit to scan in a first predetermined direction, an fθ optical system, the plurality of beams deflected by the first polygonal mirror passing through the fθ optical system, a second polygonal mirror that deflects the plurality of light beams passed through the fθ optical system in a second predetermined direction which is perpendicular to the first predetermined direction, the second polygonal mirror deflecting the plurality of light beams by one line in the second predetermined direction at every scanning of the plurality of light beams in the first predetermined direction, the plurality of light beams scanning within a predetermined scanning area defined by deflection of the first polygonal mirror and the second polygonal mirror, a light receiving unit that received the plurality of light beams reflected by an object located within the predetermined scanning area, and an operation system that obtains a three-dimensional shape and color of the object based on output of the light receiving unit.

Optionally, the multi-beam light source unit may include at least first laser source, second laser source and third laser source that emit laser beams having different wavelengths.

In this case, the operation system may include a direction detection system that detects a direction in which the plurality of laser beams proceed, and an object surface position detection system that detects a distance to an object surface at a point on which the plurality of laser beams, whose proceeding direction is detected, are incident and reflected.

Further, the object surface position detection system may include a distance detection device that detects a distance between the light source unit to the surface of the object based on a time duration between emission of the light beams to reception of the reflected light beams.

Further optionally, the light receiving unit may include an area sensor, and the multi-beam color scanning device may include a collecting lens that converges light beams reflected by a surface of the object on the area sensor.

In a particular case, the multi-beam color scanning device may be provided with a beam splitter arranged on an optical path of the plurality of light beams between the multi-beam light source unit and the first polygonal mirror. With this configuration, the light beams reflected on the surface of the object enter the beam splitter through the second polygonal mirror, the fθ optical system and the first polygonal mirror, the plurality of light beams being split to respective wavelength components by the beam splitter and entering the light receiving unit.

In this case, the light receiving unit may include a plurality of photo detectors corresponding to the plurality of wavelength components.

Optionally, the fθ optical system may include a decentered fθ lens which is arranged to be decentered in the second predetermined direction.

Still optionally, the multi-beam color scanning device may include a mirror system that deflects the laser beams reflected by the object surface to a second reflection surface of the second polygonal mirror, which is different from the surface on which the laser beams passing through the fθ optical system, and a collecting lens that converges the beams reflected by the second reflection surface on the light receiving unit.

In this case, the light receiving unit may include a line sensor for each of the plurality of light beams.

According to another aspect of the invention, there is provided a multi-beam image scanning device, which is provided with a multi-beam light source unit that emits a plurality of light beams having different wavelengths, the plurality of light beams being aligned in a main scanning direction, a first polygonal mirror that deflects the plurality of light beams emitted by the multi-beam light source in the main scanning direction, an fθ optical system, the plurality of light beams deflected by the first polygonal mirror to scan at a substantially constant speed, a second polygonal mirror that deflects the plurality of light beams passed through the fθ optical system in an auxiliary scanning direction that is perpendicular to the main scanning direction, the second polygonal mirror deflects the plurality of light beams in the auxiliary direction by one line at each main scanning of the plurality of light beams, the plurality of light beams scanning in the main scanning direction and in the auxiliary scanning direction being directed to an object to be measured, a light receiving unit that receives the plurality of light beams reflected by the object and output signals corresponding to the received light beams, and a data processing system that processes output signals of the light receiving unit to generate three-dimensional shape information of the object.

Optionally, the multi-beam scanning device may include a horizontal synchronizing signal generating system that detects passage of at least one of the plurality of light beams through a predetermined position in the main scanning direction and generates a horizontal synchronizing signal, and a vertical synchronizing signal generating system that detects passage of the plurality of light beams through another predetermined position in the auxiliary scanning direction and generates a vertical synchronizing signal. With this configuration, the data processing system may process the output signals of the light receiving unit in accordance with the horizontal synchronizing signal and the vertical synchronizing signal.

In particular, the horizontal synchronizing signal generating system may detect passage of each of the plurality of light beams through the predetermined position in the main scanning direction and generates a horizontal synchronizing signal for each of the plurality of light beams.

In an example, the plurality of light beams may include first, second and third light beams having different wavelengths.

Specifically, the light source unit may include first, second and third laser diodes that emit the first, second and third light beams, respectively.

More specifically, the first, second and third light beams may be red, green and blue beams, respectively.

DETAILED DESCRIPTION OF THE EMBODIMENTS

Hereinafter, referring to the accompanying drawings, embodiments of the invention will be described.

First Embodiment

Figure 1:
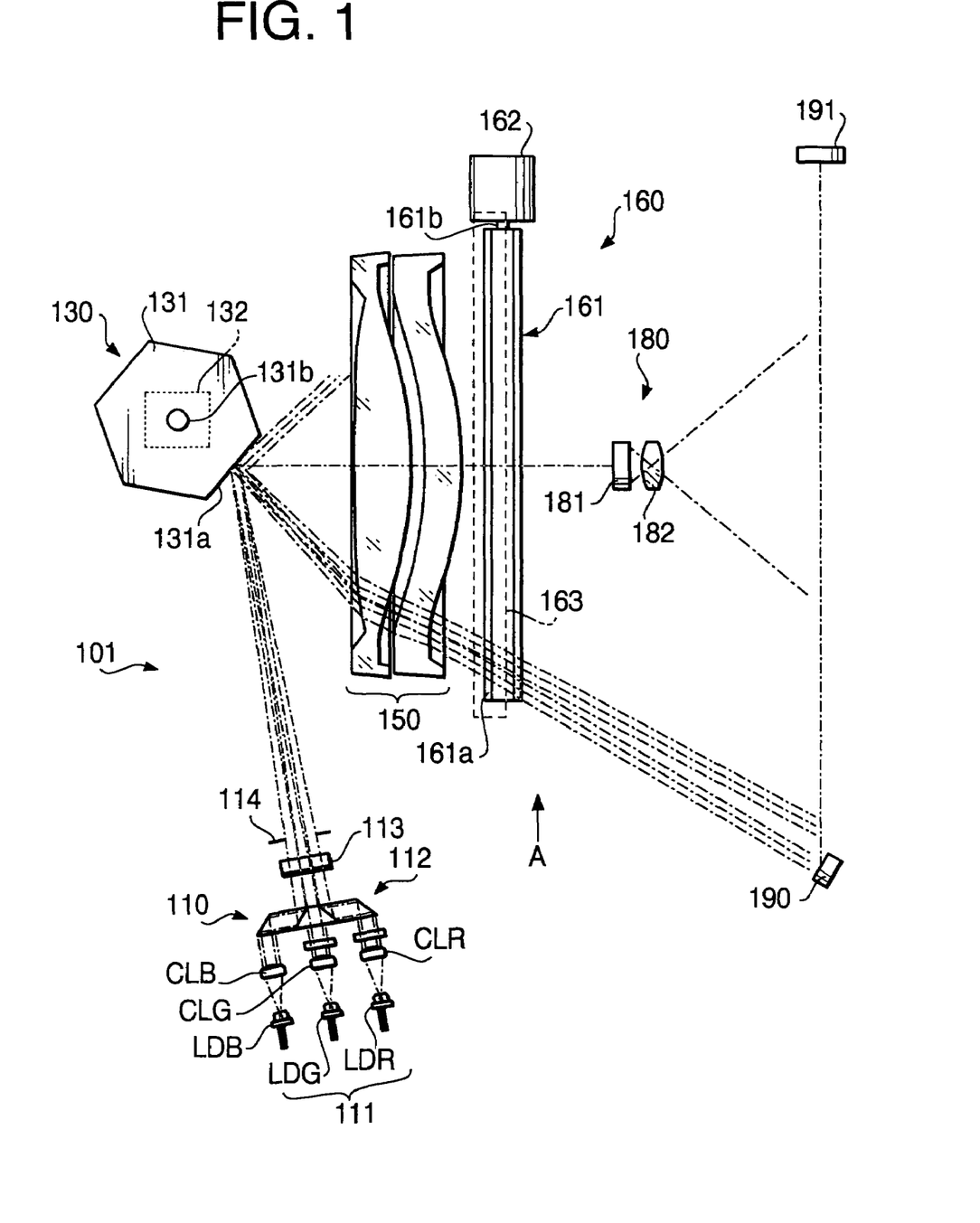
FIG. 1 is a plan view of an optical system of a multi-beam image scanning device according to a first embodiment of the invention.
Figure 2:
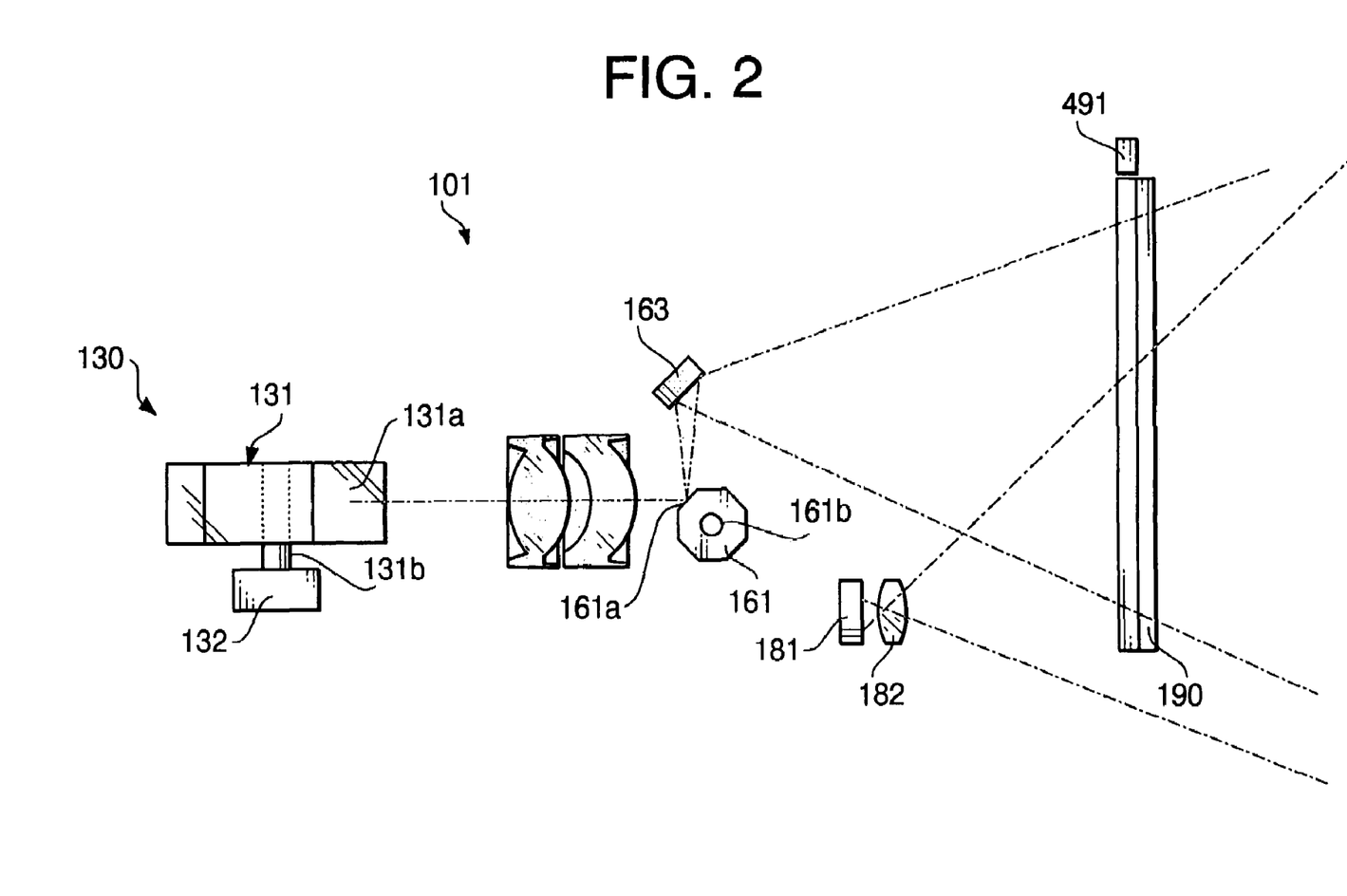
FIG. 2 is a side view of the optical system of the multi-beam image scanning device shown in FIG. 1, viewed from arrow A in FIG. 1.

FIG. 1 is a plan view of an optical system of a multi-beam color scanning device 101 according to a first embodiment of the invention. FIG. 2 is a side view of the optical system of the multi-beam scanning device 101 shown in FIG. 1, viewed from arrow A in FIG. 1.

The scanning device 101 includes a light source unit 110, a horizontal scanning unit 130, an fθ lens 150, a vertical scanning unit 160, a light receiving unit 180, a concave mirror 190 and a first sensor 191.

The light source unit 110 is provided with a multi-beam laser array 111. The multi-beam laser array 111 includes a blue laser source LDB, a green laser source LDG and a red laser source LDR, which are arranged in this order on a horizontal plane that is parallel with a plane of FIG. 1, and are configured to emit blue laser beam BB, green laser beam BG and red laser beam BR as pulsed beams, respectively. The laser beams BB, BG and BR emitted by the blue laser source LDB, green laser source LDG and red laser source LDR enter collimating lenses CLB, CLG and CLR, respectively, and are converted into beams having parallel light fluxes.

Next, the laser beams enter a prism unit 112. The prism unit 112 deflects the laser beams such that the blue, green and red laser beams are substantially parallel with each other on a horizontal plane, and closely adjacent to each other.

The structure of the prism unit 112 will be described in detail below.

Figure 3:
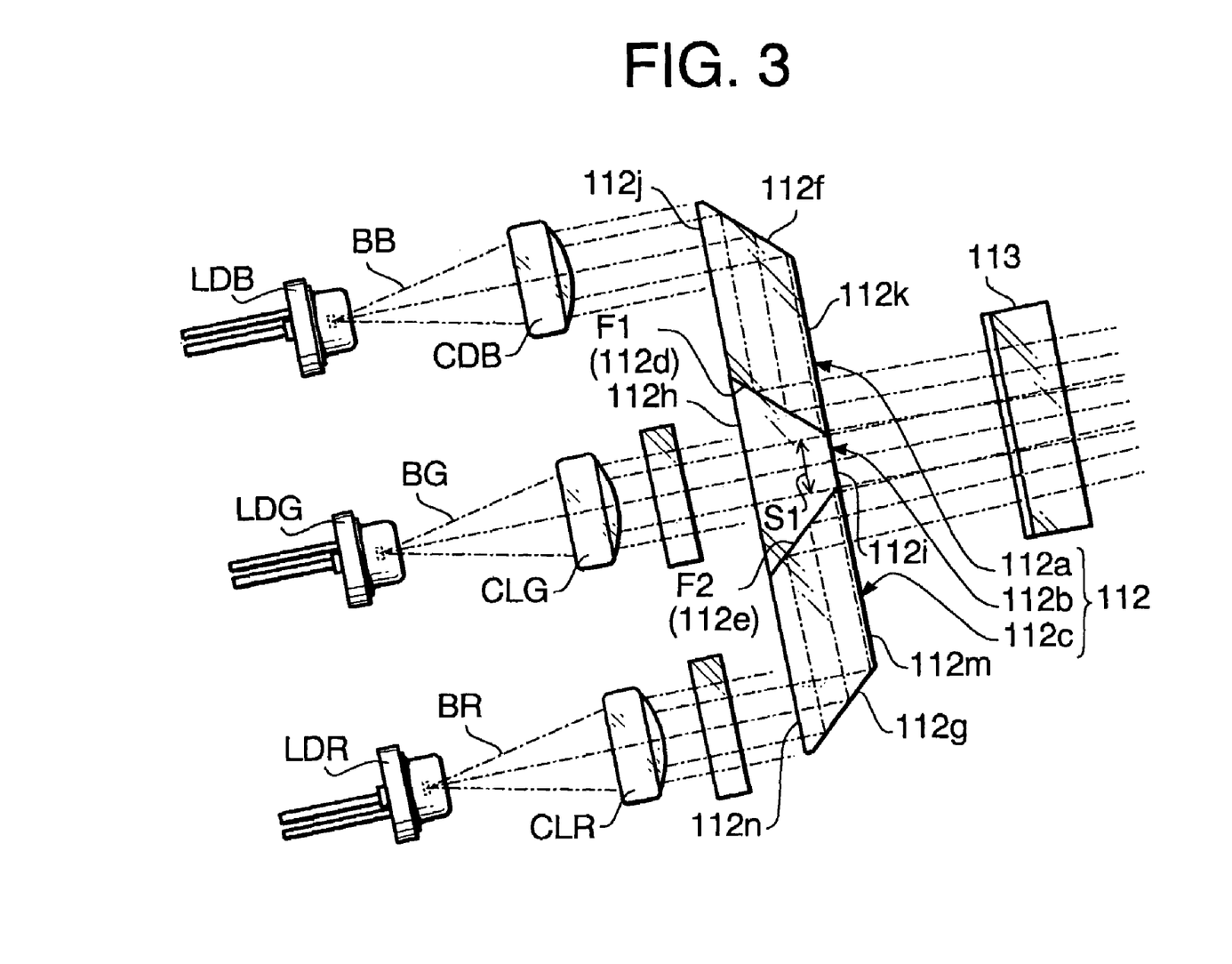
FIG. 3 is an enlarged view of a light source unit according to the first embodiment.

FIG. 3 is an enlarged view of the light source unit 110 according to the embodiment of the invention.

The prism unit 112 has a first prism 112a, a second prism 112b and a third prism 112c, on which the blue, green and red laser beams BB, BG and BR are incident, respectively.

The second prism 112b are arranged between the first prism 112a and the second prism 112c. One of two opposite side surfaces of the second prism 112b is cemented with a side surface of the first prism 112a, and the other of the two opposite side surfaces of the second prism 112b is cemented with a side surface of the third prism 112c.

At the surfaces where the first and second prisms 112a and 112b are cemented (indicated by F1), a first reflection layer 112d for specularly reflecting the beams incident thereon is provided. At the surfaces where the second and third prisms 112b and 112c are cemented (indicated by F2), a second reflection layer 112e for specularly reflecting the beams incident thereon is provided.

Further, on a surface of the first prism 112a opposite to the surface provided with the first reflection layer 112d, a third reflection layer 112f is provided. On a surface of the third prism 112c opposite to the surface provided with the second reflection layer 112e, a fourth reflection layer 112g is provided. The surfaces 112f and 112g are also configured to specularly reflect the beams incident thereon. As each of the first, second, third and fourth reflection layers 112d, 112e, 112f and 112g, a thin metal coating may be used.

The second prism 112b has a trapezoidal cross section in the plan view. The second prism 112b has a front surface 112h and a rear surface 112i which is narrower than the front surface 112h. The second prism 112b is arranged such that the front surface 112f is located on the green laser source LDG side, and the rear surface 112i is located on the horizontal scanning unit 130, on the optical path of the green laser beam BG. With this arrangement, the green laser beam BG enters the second prism 112b through its front surface 112h, and emerges from the second prism 112b through the rear surface 112i toward the horizontal scanning unit 130 (see FIG. 1).

The first and second reflection layers 112d and 112e are provided on the side surfaces of the second prism 112b. Accordingly, a clearance S1 between the reflection layers 112d and 112e is substantially equal to the width of the top surface of the second prism 112b. It should be noted that the width of the top surface 112i of the second prism 112b is narrower than the width of the green laser beam BG. Therefore, the distance between the closer ends of the first and second reflection layers 112d and 112e is smaller than the width of the green laser beam BG.

According to the first embodiment, the prism unit 112 is arranged such that the chief ray of the green laser beam BG passes at substantially the center of the rear surface 112i of the second prism 112b. It should be noted that, according to the embodiments, a peripheral portion of the green laser beam BG is incident on the first reflection layer 112d and the second reflection layer 112e, and reflected thereby. The reflected light fluxes proceed in a direction different from the direction toward the horizontal scanning unit 130. Therefore, as the green laser beam BG passes the prism unit 112, the width of the green laser beam BG is limited by the clearance S1 between the closer ends of the first and second reflection layers 112*d* and 112*e*.

The blue laser beam BB enters the first prism 112*a* from its front surface 112*j*, and is reflected by the third reflection layer 112*f* toward the first reflection layer 112*d*. Then, the blue laser beam BB is reflected by the first reflection surface 112*d* and emerges, from the rear surface 112*k* of the first prism 112*a*, to the horizontal scanning unit 130.

The third reflection layer 112*f* reflects the blue laser beam BB at an angle at which the blue laser beam BB is incident on the first reflection layer 112 on a polygonal mirror side end portion. Then, the blue laser beam BB reflected by the first reflection layer 112*d* emerges from a position closely adjacent to a position where the green laser beam BG emerges from the prism unit 112 or from a position next to the position where the green laser beam BG emerges from the prism unit 112. Therefore, in the multi-beam scanning device 101, a split angle θ formed between the blue laser beam BB and the green laser beam BG in the direction where the polygonal mirror 131 (see FIG. 1) rotates is very small.

The red laser beam BR enters the third prism 112*c* from its front surface 112*n*, and is reflected by the fourth reflection layer 112*g* toward the second reflection layer 112*e*. Then, the red laser beam BR is reflected by the second reflection layer 112*e* and emerges, from the rear surface 112*m* of the third prism 112*c*, to the horizontal scanning unit 130.

The fourth reflection layer 112*g* reflects the red laser beam BR at an angle at which the red laser beam BR is incident on the second reflection layer 112*e* at a polygonal mirror side end portion. Then, the red laser beam BR reflected by the second reflection layer 112*e* emerges from a position closely adjacent to a position where the green laser beam BG emerges from the prism unit 112 or from a position next to the position where the green laser beam BG emerges from the prism unit 112. Therefore, in the multi-beam scanning device 101, a split angles θ that are angles formed between the red laser beam BR and the green laser beam BG in the direction where the polygonal mirror 131 rotates are very small.

As described above, according to the prism unit 112, the blue, green and red laser beams BB, BG and BR are emitted so that they are on the same horizontal plane, parallel with each other and closed adjacent to each other.

The laser beams emerged from the prism unit 112 proceed in the horizontal direction, and are directed to the horizontal scanning unit 130 through the cylindrical lens 113 and a silt 114 (see FIG. 1).

The cylindrical lens 113 has a power in the vertical direction (that is perpendicular to the plane of FIG. 1) such that the beams passed therethrough converge, only in the vertical direction, on a plane in the vicinity of the reflection surface 131*a* of the polygonal mirror 131. The slit 114 is configured to define the area of each of the blue, green and red laser beams. In the present embodiment, the blue, green and red laser beams passed through the slit have substantially the same width.

The horizontal scanning unit 130 includes a first polygonal mirror 131 and a first motor 132 for rotating the first polygonal mirror 131. The laser beams BB, BG and BR are directed to be incident on the reflection surface 131*a* of the first polygonal mirror 131.

The first polygonal mirror 131 has a rotation axis 131*b* that extends in the vertical direction, and thus rotates in a direction parallel with the horizontal direction. The reflection surface 131*a* are parallel with the rotation axis 131*b* of the first polygonal mirror 131. The laser beams incident on the reflection surface 131*a* are deflected thereby, and proceed with the parallel relationship therebetween maintained, in the horizontal direction. The first motor 132 rotates the first polygonal mirror 131 about the rotation axis 131*b* at a constant angular speed. Therefore, the laser beams incident on the reflection surface 131*a* of the first polygonal mirror 131 are reflected and scan within a predetermined angular range in the horizontal direction at a predetermined period.

The laser beams reflected by the reflection surface 131*a* pass through the fθ lens 150 and are incident on the vertical scanning unit 160.

The vertical scanning unit 160 includes a second polygonal mirror 161 and a second motor 162 for rotating the second polygonal mirror 161 about a rotation axis 161*b*, which extends in the horizontal direction. The laser beams incident on the reflection surface 161*a* of the second polygonal mirror 161 are deflected thereby and proceed to enter a mirror 163 with the parallel and closely adjacent relationship therebetween remained (see FIG. 2). The laser beams incident on the mirror 163 are further deflected by the mirror 163. The second motor 162 rotates the second polygonal mirror 161 about the rotation axis 161*b* at a constant angular speed. Therefore, the laser beams incident on the reflection surface 161*a* of the second polygonal mirror 161 and the mirror 163 scan within a predetermined angular range in the vertical direction at a predetermined period.

In the multi-beam color scanning device 101 configured as above, by setting the period of the vertical scanning to an integer multiple of the period of the horizontal scanning, a plurality of horizontal scanning operations (i.e., the main scanning operations) are performed during one vertical scanning operation (i.e., the auxiliary scanning operation). Thus, the multi-beam color scanning device 101 is capable of scan within a two-dimensional area (i.e., a scanning area) defined by a deflectable angle defined by the first polygonal mirror 131 and a deflectable angle defined by the second polygonal mirror 161 and the mirror 163.

When an object is located within the scanning area, the laser beams incident on the object are reflected on the surface of the object. The reflected beams are received by the light receiving unit 180. According to the first embodiment, the light receiving unit 180 has a photo sensor 181 and a collecting lens 182. That is, the laser beams reflected by the outer surface of the object are collected by the collecting lens 182, and are incident on the photo sensor 181.

The photo sensor 181 is configured to detect the intensities of the red, blue and green components of the received beams, respectively. Thus, based on the detection results of the photo sensor 181, the color of the object surface can be determined.

Further, as shown in FIG. 1 or FIG. 2, a concave reflector 190 is arranged at an end portion of the main scanning range of the beams. The beams incident on the concave reflector 190 are converged on a sensor 191, an output of which is used for generating a horizontal synchronizing signal. According to the first embodiment shown in FIG. 1, the laser beams are incident on the concave reflector 190 and then, on the sensor 191 when the laser beams are directed to the lowermost position in FIG. 1.

As aforementioned, the horizontal synchronizing signal is generated based on the output of the first sensor 191. Based on a duration of time after a laser beam is incident on the first sensor 191, a position of the laser beam in the horizontal direction (i.e., in the main scanning direction) can be known.

Further to the above, another photo detector 491 is provided an the upper end of the concave mirror 190, the output of the photo detector 491 is used as a vertical synchronizing signal. Using the thus generated vertical synchronizing signal, the position of the laser beam in the vertical direction can be known. As above, with reference to the horizontal and vertical synchronizing signals and a duration of time thereafter, the direction in which each beam proceeds can be known.

Further, based on a difference between a time at which the pulsed laser beam is emitted from each laser source and a time at which a reflection of the pulsed beam is detected by the photo sensor 181, a distance from the laser source to the photo sensor 181 via the surface of the object is calculated. According to the embodiment, the distance from the laser source to the photo sensor 181 is much shorter than the distance from the laser source to the object. Therefore, half the distance as calculated can be regarded as the distance from the laser source to the object surface.

Optionally, when the distance from the laser source to the first photo sensor 181 can be calculated, it is subtracted from the distance between the laser source to the photo sensor 181 via the object surface, thereby the distance from the laser source to the object surface being calculated accurately.

As described above, the color of the object surface, the direction where the laser beams proceed, and the distance from the laser source to the object surface can be obtained. Therefore, according to the first embodiment, the position of the object, the color of the object surface can be detected, and the three-dimensional information of the object can be obtained.

According to the first embodiment, as the photo sensor 181, an area sensor such as a color CCD which is capable of detecting a position of the incident beam is used. Then, with the photo sensor 181, the intensity of the laser beam reflected by the object surface and a distance from a reference position (e.g., the position of the laser source) to the object surface is calculated. However, the invention needs not be limited to such a configuration. Another structure for detecting the intensity of the reflected laser beam and the position of the object surface can be employed. Second and third embodiments described below employ configurations different from the first embodiment.

Figure 8:
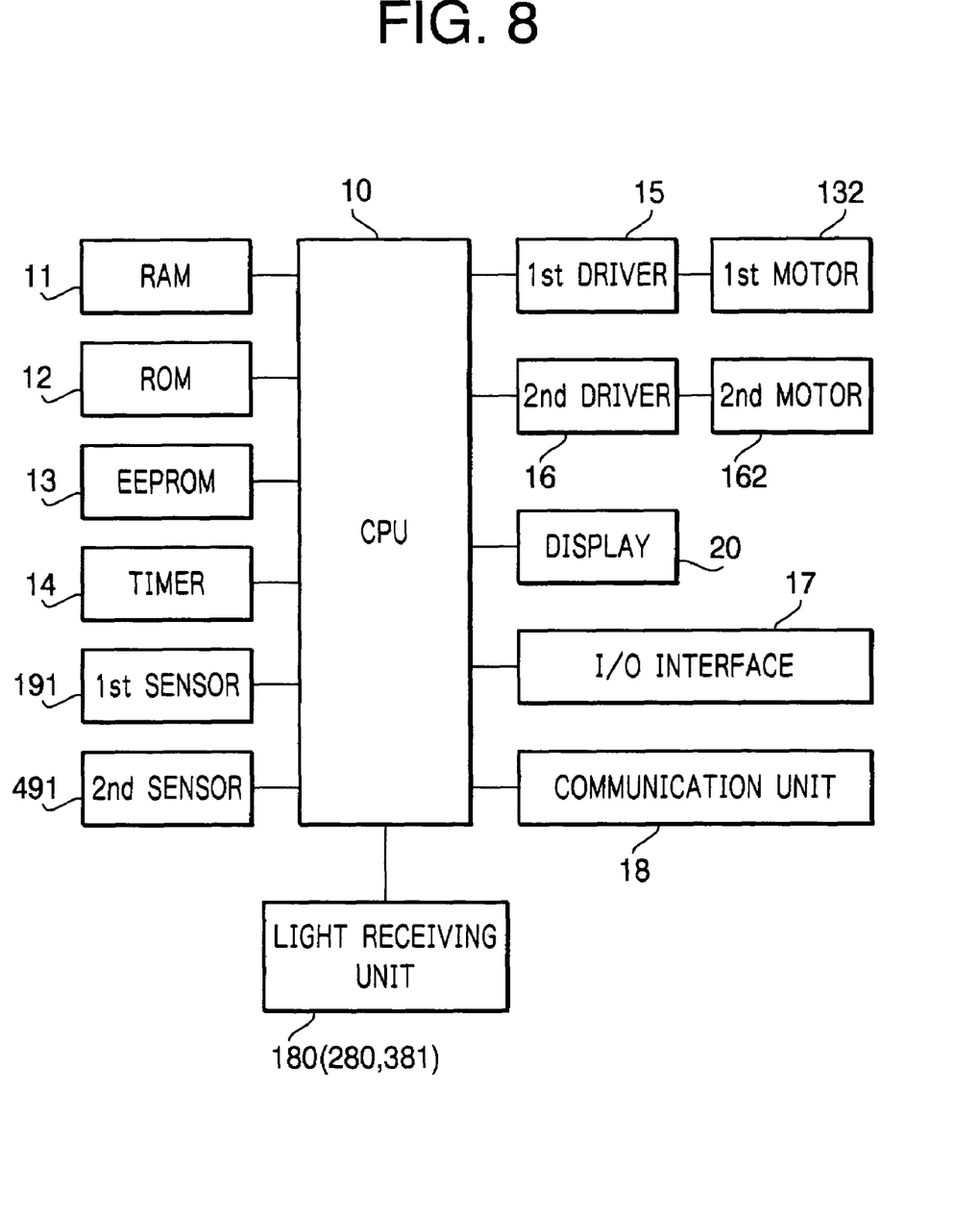
FIG. 8 is a block diagram showing a configuration of the three-dimensional color scanning device according to the invention.

FIG. 8 is a block diagram showing a configuration of the three-dimensional color scanning device 101 according to the first embodiment of the invention.

The scanning device 101 includes a CPU (Central Processing Unit) 10 connected with a RAM (Random Access Memory) 11, a ROM (Read Only Memory) 12, an EEPROM (Electrically Erasable Programmable ROM) 13. The CPU 10 controls the entire operation of the scanning device 101. The ROM 12 stores programs to be executed by the CPU 10 so that the scanning device 101 functions. The RAM 11 functions as a work area of the CPU 10 and stores various data during execution of the programs stored in the ROM 10. The EEPROM 13 stores various operational parameters. Some programs may also be stored in the EEPROM 13.

The scanning device 101 is further provided with the first sensor 191 and the second sensor 491. The CPU 10 generates, as aforementioned, the horizontal synchronizing signal based on the output of the first sensor 191 and the vertical synchronizing signal based on the output of the second sensor 491. The scanning device 101 further includes a timer 14 that is used for measuring time durations.

The scanning device 101 further includes a first driver for controlling the first motor 132 to rotate, and a second driver for controlling the second motor 162 to rotate. Optionally, the scanning device 101 is provided with a display 20, an I/O (input/output) interface 17 and a communication unit 18. The display 20 is for displaying the obtained three-dimensional information on a screen. The I/O interface is used for receiving various data including operational commands, and for outputting data as obtained to an external device such as a storage device. The communication unit 18 is for transmitting the obtained data to a personal computer or the like through a communication network.

The light receiving unit 180 is also connected to the CPU 10. The CPU 10 processed the output of the light receiving unit 180 to construct a three-dimensional shape of the object. Specifically, based on the directions in which the laser beams proceed, durations of time between emission of the beams and reception of the reflected beams, color components of the received beams and the like, the three-dimensional color image of the object is obtained by the CPU 10.

Second Embodiment

Figure 4:
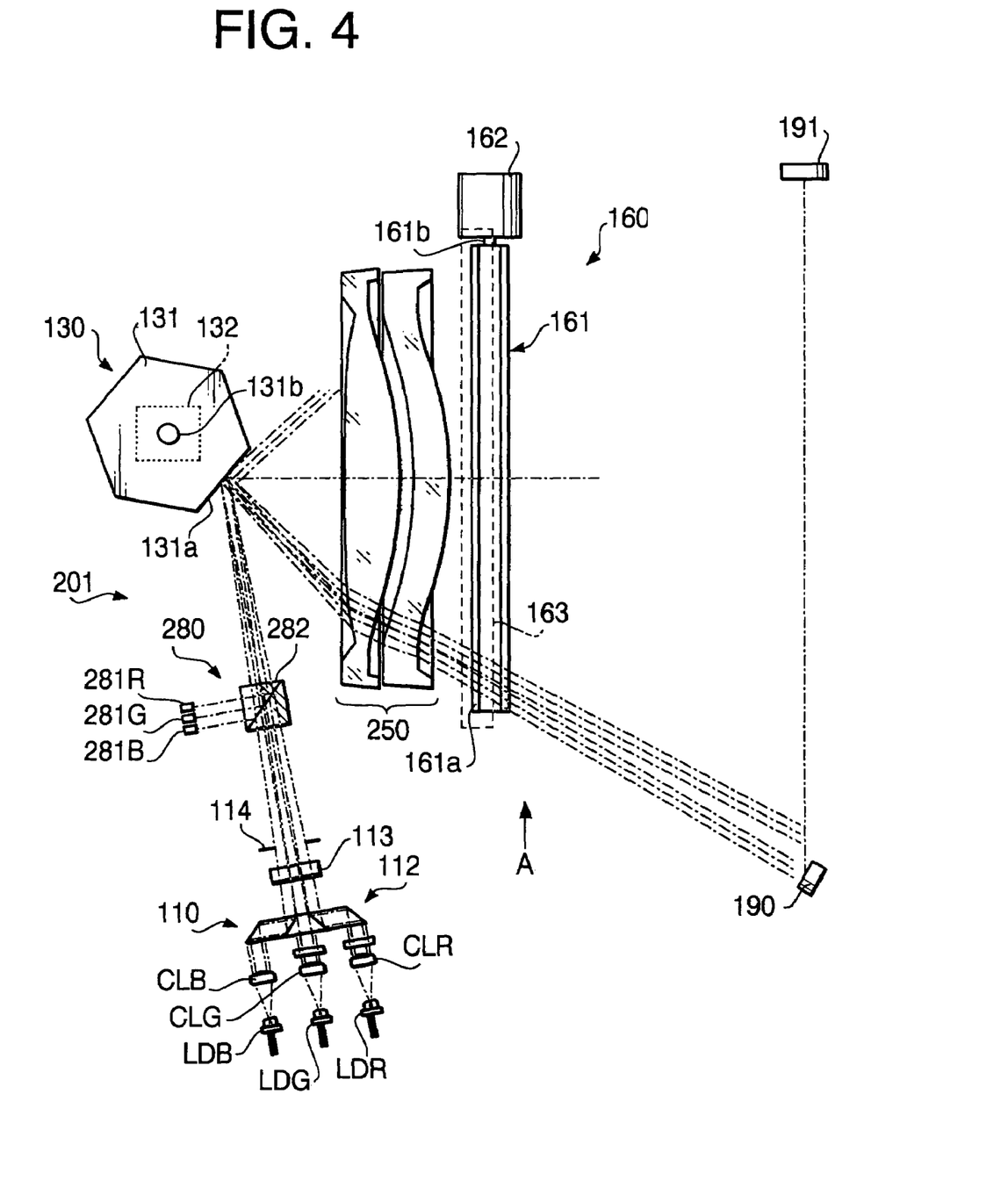
FIG. 4 is a plan view of an optical system of the multi-beam image scanning device according to a second embodiment of the invention.
Figure 5:
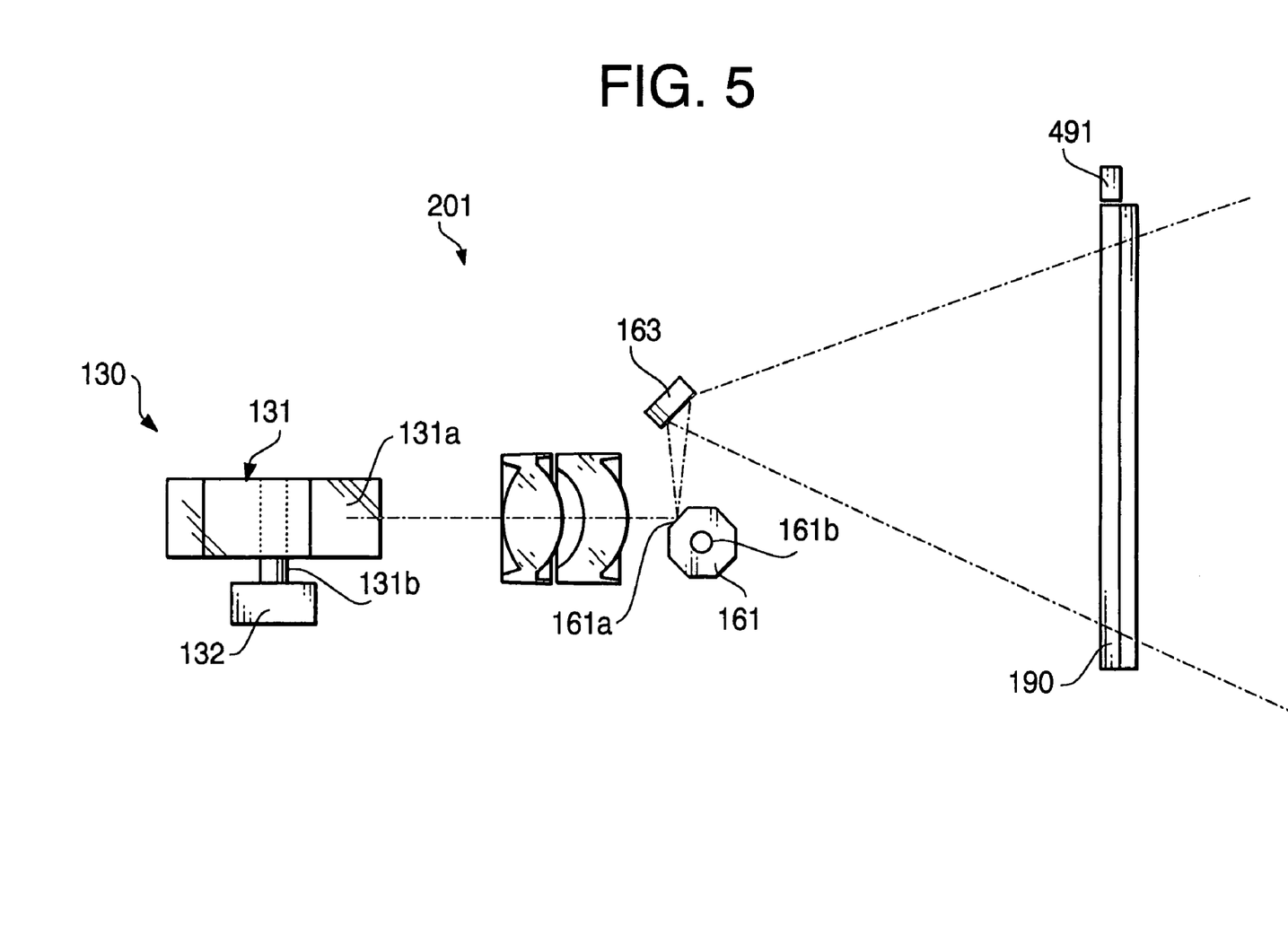
FIG. 5 is a side view of the optical system of the multi-beam image scanning device shown in FIG. 4, viewed from arrow A in FIG. 4.

FIG. 4 is a plan view of an optical system of a multi-beam color scanning device 201 according to a second embodiment. FIG. 5 is a side view of the optical system of the multi-beam color scanning device 201, viewed along a direction of arrow A of FIG. 4. The structure of the light source unit 110, the horizontal scanning unit 130, the vertical scanning unit 160, the concave reflector 190 and the sensor 191 are similar to those of the first embodiment.

In the second embodiment, the light receiving unit 180 is replaced with a beam splitter 282 arranged between the light source unit 110 and the horizontal scanning unit 130, and a light receiving unit 280 provided with photo sensors 281R, 281G and 281B.

As shown in FIG. 4, the laser beams incident on the object located within a scanning range of the beams deflected by the horizontal scanning mirror 131 and the vertical scanning mirror 161 and the mirror 163 are reflected thereby are incident on the beam splitter 282 and bent by the beam splitter 282.

The red laser beam, green laser beam and blue laser beam are incident on the photo sensors 281R, 281G and 281B, respectively. Similarly to the first embodiment, based on the time when a certain pulse of the laser beam is emitted and the time when the reflected pulse of the laser beam is received by the photo sensor, distances from the laser sources LDR, LDG and LDB to the photo sensors 281R, 281G and 281B, via the object surface, are calculated, respectively.

Further, the photo sensors 281R, 281G and 281B can detect intensities of the received beams, respectively. Therefore, the color of the object surface can be calculated.

As described above, according to the second embodiment, the position and color of the object located within the scanning range can be detected, and therefore, the three-dimensional image information of the object can be obtained.

It should be noted that, in the second embodiment, the fθ lens 250 is a decentered lens, and is configured such that the laser beams reflected by the surface of the fθ lens do not enter the beam splitter 282 and are incident on the photo sensors 281R, 281G and 281B.

Third Embodiment

Figure 6:
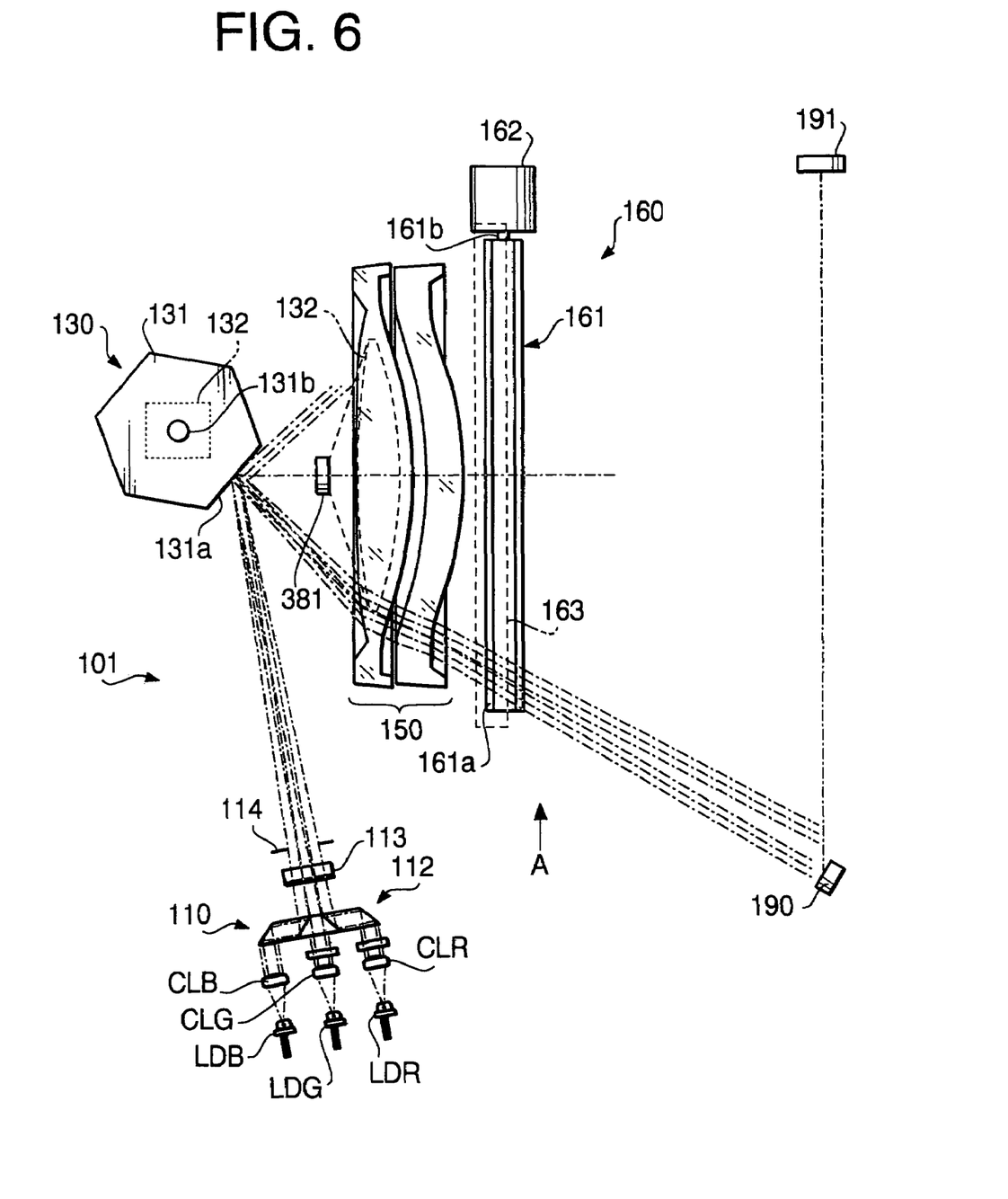
FIG. 6 is a plan view of an optical system of the multi-beam image scanning device according to a third embodiment of the invention.
Figure 7:
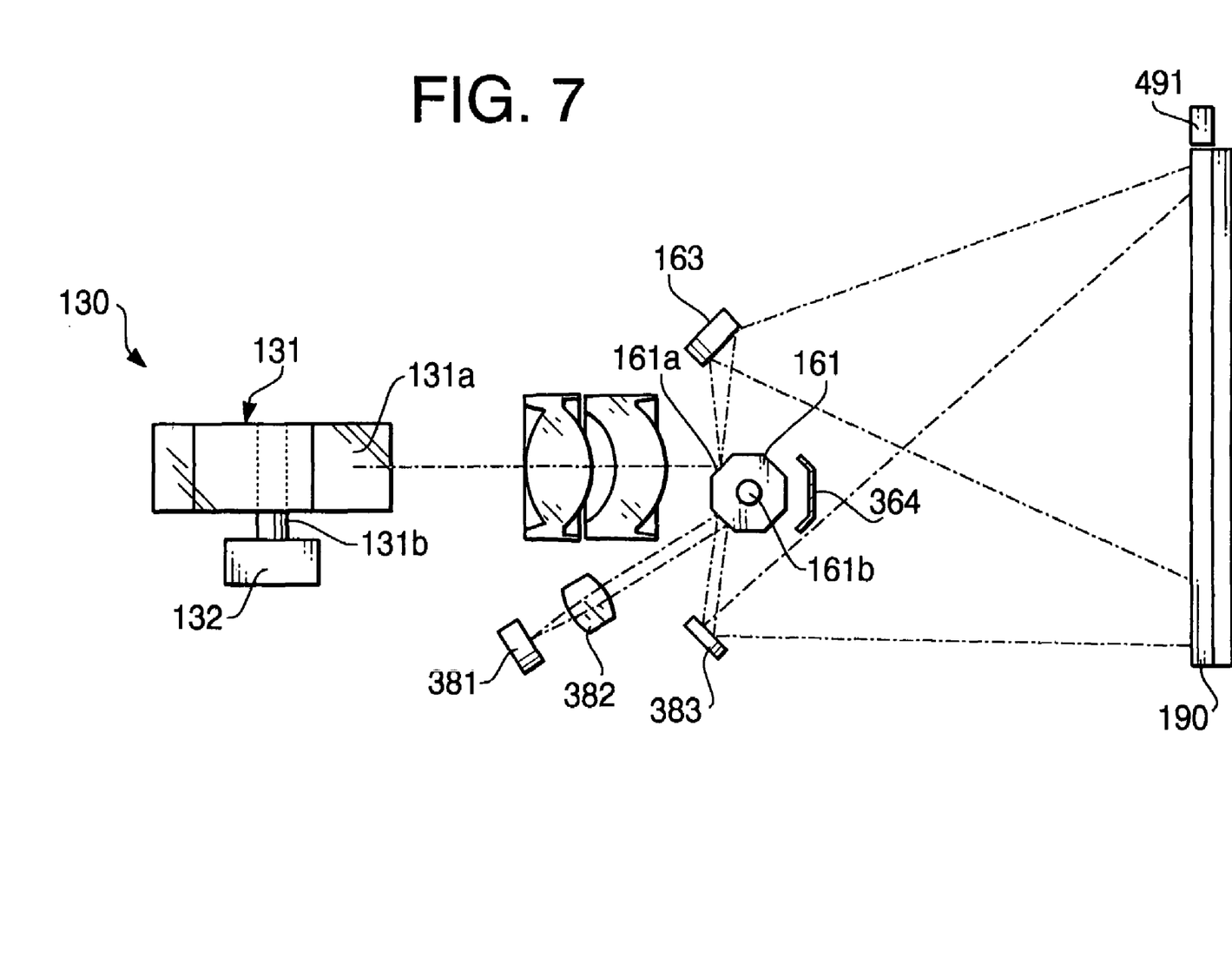
FIG. 7 is a side view of the optical system of the multi-beam image scanning device shown in FIG. 6, viewed from arrow A in FIG. 6.

FIG. 6 is a plan view of an optical system of a multi-beam color scanning device 301 according to a third embodiment. FIG. 7 is a side view of the optical system of the multi-beam color scanning device viewed along arrow A of FIG. 6. The structures of the light source unit 110, the horizontal scanning unit 130, the fθ lens 150, the vertical scanning unit 160, the concave reflector 190 are similar to those in the first embodiment, and description thereof will be omitted.

In the second embodiment, the light receiving unit 180 of the first embodiment is replaced with a light receiving unit 180a, photo sensor 381, a collecting lens 382, a mirror 383.

As shown in FIG. 7, the laser beams reflected by the object located within the scanning area are incident on the mirror 383, which deflects the incident beams toward the vertical scanning polygonal mirror 161. The laser beams incident on the vertical scanning polygonal mirror 161 are deflected thereby and are incident on the collecting lens 382, which converges the incident beams on the photo sensor 381.

According to the third embodiment, the laser beams reflected by the object located in the scanning area are deflected again by the vertical deflecting polygonal mirror 161. Accordingly, the reflected beams are scanning beams that scan only in the main scanning direction, substantially. As the reflected beams, which have been deflected by the vertical polygonal mirror 161, pass through the collecting lens 382, the beams are incident on the photo sensor 381 along a line. Therefore, according to the third embodiment, the photo sensor 381 is a line sensor provided with a light receiving area arranged in a line, which receives the laser beams converged by the collecting lens 382. The photo sensor 381 detects the intensities and time durations of the red, green and blue laser beams incident thereon, respectively.

According to the third embodiment, based on the time when a certain pulse of the laser beam is emitted and the time when the reflected pulse of the laser beam is received by the photo sensor, distances from the laser sources LDR, LDG and LDB to the photo sensor 381, via the object surface, are calculated, respectively.

Further, similarly to the first embodiment, the direction in which the laser beams proceed can be detected.

Furthermore, according to the third embodiment, it is only necessary to arrange the photo sensor 381, the collecting lens 382 and the mirror 383 such that the light beams are converged on a point on the linear light receiving area of the lines sensor 381, and an expensive area sensor is unnecessary. Thus, the multi-beam color scanning device according to the first embodiment requires less manufacturing cost than that according to the first embodiment.

As described above, according to the third embodiment, the position and the color of the object located within a scanning area can be detected, and thus three-dimensional color image information of the object can be obtained.

The present disclosure relates to the subject matter contained in Japanese Patent Application No. 2003-014020, filed on Jan. 22, 2003, which is expressly incorporated herein by reference in its entirety.

What is claimed is:

1. A multi-beam color scanning device, comprising:
a multi-beam light source unit that emits a plurality of light beams having different wavelengths;
a first polygonal mirror that deflects the plurality of light beams emitted by said multi-beam light source unit to scan in a first predetermined direction;
an fθ optical system, the plurality of beams deflected by said first polygonal mirror passing through said fθ optical system;
a second polygonal mirror that deflects the plurality of light beams passed through said fθ optical system in a second predetermined direction which is perpendicular to the first predetermined direction, said second polygonal mirror deflecting the plurality of light beams by one line in the second predetermined direction at every scanning of the plurality of light beams in said first predetermined direction, the plurality of light beams scanning within a predetermined scanning area defined by deflection of said first polygonal mirror and said second polygonal mirror;
a light receiving unit that received the plurality of light beams reflected by an object located within the predetermined scanning area,
an operation system that obtains a three-dimensional shape and color of the object based on output of said light receiving unit.

2. The multi-beam color scanning device according to claim 1, wherein said multi-beam light source unit includes at least first laser source, second laser source and third laser source that emit laser beams having different wavelengths.

3. The multi-beam color scanning device according to claim 2, wherein said operation system includes:
a direction detection system that detects a direction in which the plurality of laser beams proceed; and
an object surface position detection system that detects a distance to an object surface at a point on which the plurality of laser beams whose proceeding direction is detected are incident and reflected.

4. The multi-beam color scanning device according to claim 3, wherein said object surface position detection system includes a distance detection device that detects a distance between the light source unit to the surface of the object based on a time duration between emission of the light beams to reception of the reflected light beams.

5. The multi-beam color scanning device according to claim 1,
wherein said light receiving unit includes an area sensor, and
wherein said multi-beam color scanning device includes a collecting lens that converges light beams reflected by a surface of the object on said area sensor.

6. The multi-beam color scanning device according to claim 1, further comprising a beam splitter arranged on an optical path of the plurality of light beams between said multi-beam light source unit and said first polygonal mirror,
wherein the light beams reflected on the surface of the object enter said beam splitter through said second polygonal mirror, said fθ optical system and said first polygonal mirror, said plurality of light beams being split to respective wavelength components by said beam splitter and entering said light receiving unit.

7. The multi-beam color scanning device according to claim 6, wherein said light receiving unit includes a plurality of photo detectors corresponding to the plurality of wavelength components.

8. The multi-beam color scanning device according to claim 7, wherein said fθ optical system includes a decentered fθ lens which is arranged to be decentered in the second predetermined direction.

9. The multi-beam color scanning device according to claim 1, further comprising:
a mirror system that deflects the laser beams reflected by the object surface to a second reflection surface of said second polygonal mirror, which is different from the surface on which the laser beams passing through said fθ optical system; and a collecting lens that converges the beams reflected by said second reflection surface on said light receiving unit.

10. The multi-beam color scanning device according to claim 9, wherein said light receiving unit includes a line sensor for each of said plurality of light beams.

11. A multi-beam image scanning device, comprising:

a multi-beam light source unit that emits a plurality of light beams having different wavelengths, the plurality of light beams being aligned in a main scanning direction;

a first polygonal mirror that deflects the plurality of light beams emitted by the multi-beam light source in the main scanning direction;

an fθ optical system, the plurality of light beams deflected by said first polygonal mirror to scan at a substantially constant speed;

a second polygonal mirror that deflects the plurality of light beams passed through said fθ optical system in an auxiliary scanning direction that is perpendicular to the main scanning direction, said second polygonal mirror deflects the plurality of light beams in the auxiliary direction by one line at each main scanning of the plurality of light beams, the plurality of light beams scanning in the main scanning direction and in the auxiliary scanning direction being directed to an object to be measured;

a light receiving unit that receives the plurality of light beams reflected by the object and output signals corresponding to the received light beams; and a data processing system that processes output signals of said light receiving unit to generate three-dimensional shape information of the object.

12. The multi-beam scanning device according to claim 11, further including:

a horizontal synchronizing signal generating system that detects passage of at least one of the plurality of light beams through a predetermined position in the main scanning direction and generates a horizontal synchronizing signal; and a vertical synchronizing signal generating system that detects passage of the plurality of light beams through another predetermined position in the auxiliary scanning direction and generates a vertical synchronizing signal, said data processing system processes the output signals of said light receiving unit in accordance with the horizontal synchronizing signal and the vertical synchronizing signal.

13. The multi-beam scanning device according to claim 12, wherein said horizontal synchronizing signal generating system detects passage of each of the plurality of light beams through the predetermined position in the main scanning direction and generates a horizontal synchronizing signal for each of the plurality of light beams.

14. The multi-beam scanning device according to claim 12, wherein the plurality of light beams include first, second and third light beams having different wavelengths.

15. The multi-beam scanning device according to claim 14, wherein said light source unit comprises first, second and third laser diodes that emit the first, second and third light beams, respectively.

16. The multi-beam scanning device according to claim 15, wherein the first, second and third light beams are red, green and blue beams, respectively.

* * * * *